US009083776B2

(12) United States Patent
Frauenthal et al.

(10) Patent No.: US 9,083,776 B2
(45) Date of Patent: *Jul. 14, 2015

(54) ECHO MITIGATION IN A CONFERENCE CALL

(71) Applicant: Cisco Technology, Inc., San Jose, CA (US)

(72) Inventors: James C. Frauenthal, Colts Neck, NJ (US); Michael P. O'Brien, Manasquan, NJ (US); Michael Anthony Ramalho, Sarasota, FL (US); Gary Alan Skrabutenas, Palo Alto, CA (US); Shmuel Shaffer, Palo Alto, CA (US); Steven L. Christenson, Campbell, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/867,884

(22) Filed: Apr. 22, 2013

(65) Prior Publication Data

US 2013/0230152 A1    Sep. 5, 2013

Related U.S. Application Data

(63) Continuation of application No. 12/326,756, filed on Dec. 2, 2008, now Pat. No. 8,428,247.

(51) Int. Cl.
*H04M 9/08* (2006.01)
*H04M 3/00* (2006.01)
*H04B 3/23* (2006.01)

(52) U.S. Cl.
CPC ............... *H04M 3/002* (2013.01); *H04B 3/23* (2013.01); *H04M 9/082* (2013.01)

(58) Field of Classification Search
CPC ................................. H04M 9/082; H04B 3/20
USPC ..................... 379/406.07, 202.01, 406.04
See application file for complete search history.

(56) References Cited

U.S. PATENT DOCUMENTS

| | | | |
|---|---|---|---|
| 5,502,717 A * | 3/1996 | Park | 370/286 |
| 7,734,034 B1 * | 6/2010 | Coughlan et al. | 379/388.07 |
| 8,095,120 B1 | 1/2012 | Blair et al. | |
| 8,428,247 B2 | 4/2013 | Frauenthal et al. | |
| 2006/0098807 A1 * | 5/2006 | Page et al. | 379/406.01 |
| 2008/0152156 A1 * | 6/2008 | Gao | 381/66 |
| 2009/0259422 A1 * | 10/2009 | Yen et al. | 702/65 |
| 2010/0135481 A1 | 6/2010 | Frauenthal et al. | |

OTHER PUBLICATIONS

"U.S. Appl. No. 12/326,756, Examiner Interview Summary mailed Sep. 5, 2012", 3 pgs.
"U.S. Appl. No. 12/326,756, Non Final Office Action mailed Jul. 20, 2012", 8 pgs.

(Continued)

*Primary Examiner* — Simon King (57) ABSTRACT

In an example embodiment, an example method is provided for echo mitigation in a conference call. In this method, a test audio signal is transmitted to a conference endpoint and as a result, an echo associated with the transmittal of the test audio signal is received. One or more parameters of the echo are then identified and an echo mitigation process is selected from multiple echo mitigation processes based on the identified parameters. The selected echo mitigation process is then applied.

21 Claims, 10 Drawing Sheets (56) References Cited

OTHER PUBLICATIONS

"U.S. Appl. No. 12/326,756, Notice of Allowance mailed Dec. 28, 2012", 8 pgs.

"U.S. Appl. No. 12/326,756, Response filed Jul. 5, 2012 to Restriction Requirement mailed Jun. 5, 2012", 6 pgs.

"U.S. Appl. No. 12/326,756, Restriction Requirement mailed Jun. 5, 2012", 6 pgs.

"U.S. Appl. No. 12/326,756, Response filed Oct. 18, 2012 to Non Final Office Action mailed Jul. 20, 2012", 7 pgs.

* cited by examiner

ECHO MITIGATION IN A CONFERENCE CALL

RELATED APPLICATION

This application is a continuation of and claims the benefit of priority under 35 U.S.C. §120 to U.S. application Ser. No. 12/326,756, filed Dec. 2, 2008, the entire contents of which is incorporated herein by reference.

FIELD

The present disclosure relates generally to telecommunications. In an example embodiment, the disclosure relates to echo mitigation in a conference call.

BACKGROUND

In general, a conference call is an interconnection between multiple participants simultaneously in different locations by way of teleconference equipment. Echoes from multiple participants may interfere with the conference call. The cancellation of echoes in a conference call is more difficult than in a single point-to-point connection because there are multiple conference endpoints in the conference call from which the echoes can be returned. If persistent, uncontrollable echo occurs in the single point-to-point connection, the problem can often be rectified by reestablishing the connection. However, the solution of reestablishing a single connection is often not available in a conference call because it is difficult to isolate the conference endpoint from which the echo is being reflected. As a result, a common solution in a conference call is to drop all connections and reestablish the conference call thereafter, which is time consuming and troublesome considering the number of participants in the conference call.

BRIEF DESCRIPTION OF DRAWINGS

The present disclosure is illustrated by way of example and not limitation in the figures of the accompanying drawings, in which like references indicate similar elements and in which.

DESCRIPTION OF EXAMPLE EMBODIMENTS

In the following description, for purposes of explanation, numerous specific details are set forth in order to provide a thorough understanding of an example embodiment of the present disclosure. It will be evident, however, to one skilled in the art that the present disclosure may be practiced without these specific details.

Overview

An example method is provided for echo mitigation in a conference call. In this method, a test audio signal is transmitted to a conference endpoint and as a result, an echo associated with the transmittal of the test audio signal is received. One or more parameters of the echo are then identified and an echo mitigation process is selected from multiple echo mitigation processes based on the identified parameters. The selected echo mitigation process is then applied.

Example Embodiments

Figure 1:
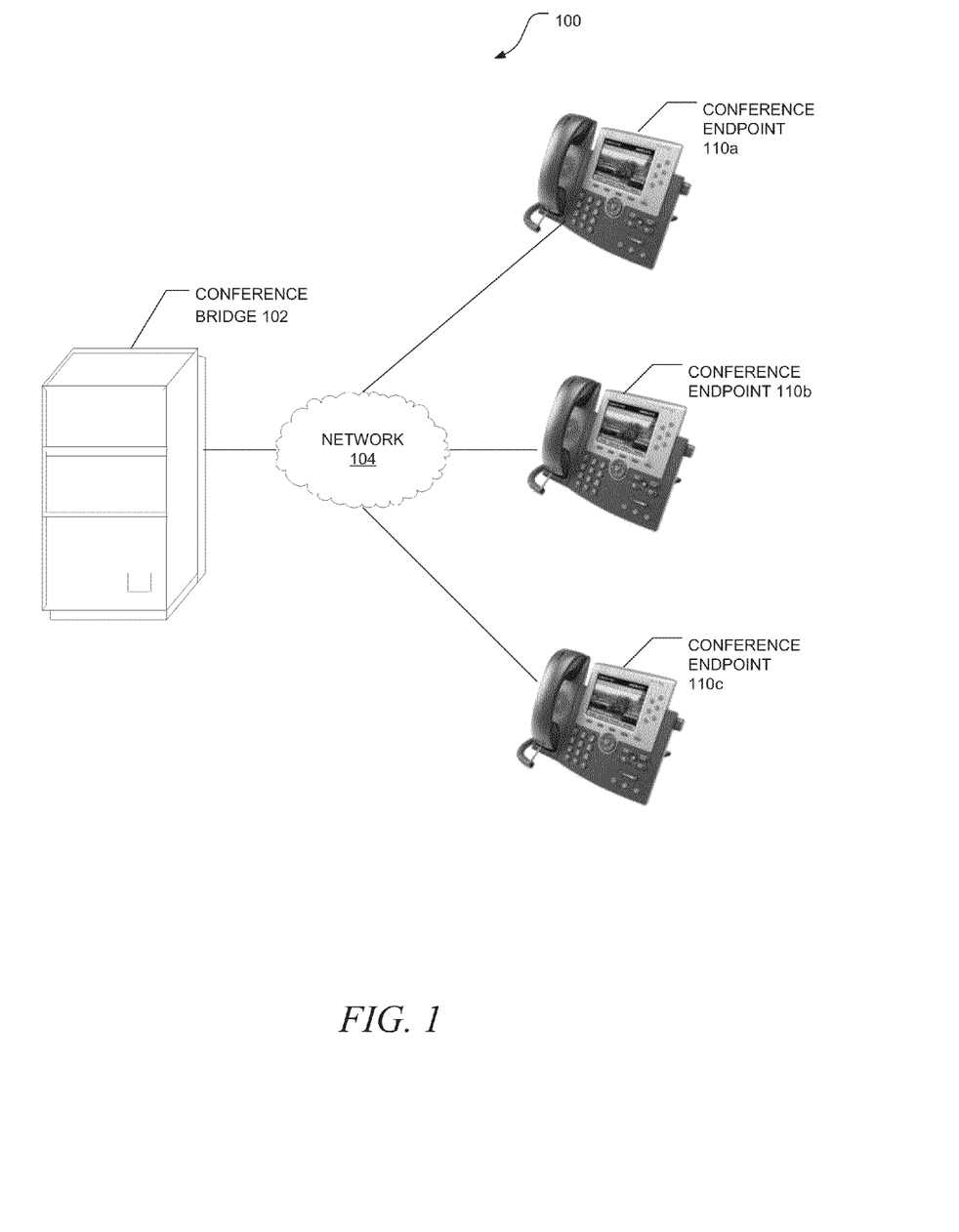
FIG. 1 depicts a diagram of a conference system, in accordance with an example embodiment.

FIG. 1 depicts a diagram of a conference system 100, in accordance with an example embodiment. The conference system 100 can, for example, be a telephone conference system, a videoconference system, or any other endpoint capable of voice communication. A telephone conference system is a set of telecommunication processing systems and technologies that are configured to allow two or more locations (or conference endpoints) to interact by way of simultaneous two-way audio transmissions. A videoconference system is a set of interactive telecommunication processing systems and technologies that are configured to allow two or more locations to interact by way of simultaneous two-way video and audio transmissions. The conference system 100 includes at least one conference bridge 102 in communication with at least one conference endpoint, such as conference endpoints 110a, 110b, and 110c, by way of network 104.

The conference bridge 102 is a telecommunication device that interconnects a number of conference endpoints 110a, 110b, and 110c to allow the conference endpoints 110a, 110b, and 110c to participate in a conference call. Each conference endpoint 110a, 110b, or 110c may include a processing system or a software application on the processing system used by a participant to connect to and participate in a conference all. Examples of conference endpoints 110a, 110b and 110c include phones (e.g., Time Division Multiplexed (TDM) phone, Voice-over-Internet protocol (VoIP) phone, or a mobile phone), software phones, computers, audio portion of a videoconference system, communication software executed on a computer, and other conference endpoints capable of voice communications.

The conference endpoints 110a, 110b, and 110c may communicate with the conference bridge 102 by way of the network 104. The network 104 may, for example, be a computer network, a public switched telephone network (PSTN), a cellular network, any combination of the aforementioned networks, or other networks that are capable of transmitting voice. A computer network is a collection of interconnected processing systems that communicate utilizing wired or wireless mediums. Examples of processing systems included in a computer network include client computers, servers, storage systems, network switches, network routers, and network hubs. Examples of computer networks include Local Area Networks (LANs) and/or Wide Area Networks (WANs), such as the Internet. The PSTN, which can also be referred to as a Plain Old Telephone System (POTS), is a collection of interconnected processing systems, Central Offices (CO), and Private Branch Exchanges (PBX) operated by telephone companies or enterprises. The PSTN may, for example, include telephones, switches, and other processing systems. A cellular network is a type of radio network that, for example, includes code division multiple access (CDMA), time division multiple access (TDMA), and other cellular networks. Mobile phones, for example, may be included in a cellular network.

During a conference call, the participants at the conference endpoints 110a, 110b, and 110c may hear echoes originating from each other participant. An "echo," as used herein, is a repetition of a waveform resulting from a reflection of the waveform from points where the characteristics of a medium through which the wave propagates change. An echo may result from a reflection from a multitude of different surfaces, such as ceilings, walls, and floors. An echo may also result from an impedance mismatch between components of the conference system 100. In general, the conference bridge 102 includes one or more echo cancellers that are configured to eliminate or reduce the echoes. As wilt be explained in more detail below, the conference bridge 102 is configured to identify parameters of the echoes and dynamically select an appropriate echo mitigation process based on the parameters of the echoes to mitigate (e.g., cancel, eliminate, or reduce) the echoes.

Figure 2:
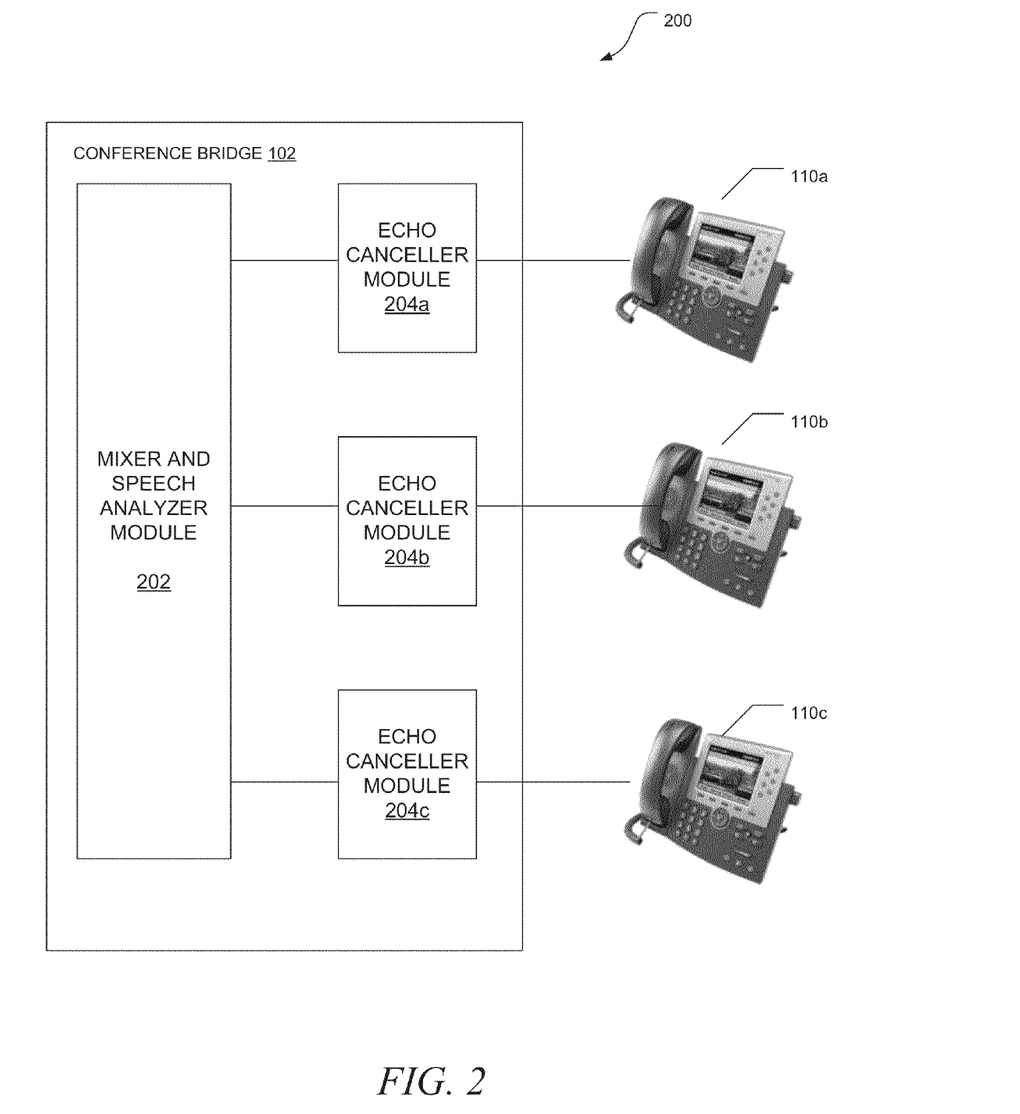
FIG. 2 depicts a block diagram of modules, in accordance with an example embodiment, included in a conference bridge.

FIG. 2 depicts a block diagram of modules 202, 204a, 204b, and 204c, in accordance with an example embodiment, included in the conference bridge 102 of a conference system 200. It should be appreciated that the conference bridge 102 is embodied as a processing system that may be deployed in the form of a variety of computing devices in communication with a network (e.g., network 104 of FIG. 1). In various example embodiments, the conference bridge 102 may be used to implement computer programs, logic, applications, methods, processes or other software to mitigate echoes based on identified parameters of the echoes, which is described in more detail below.

Referring to FIG. 2, the conference bridge 102 may include a mixer and speech analyzer module 202 and multiple echo canceller modules 204a, 204b, and 204c. The mixer and speech analyzer module 202 is configured to mix audio signals from different conference endpoints 110a, 110b, and 110c together and transmit the mixed audio signals back to the conference endpoints 110a, 110b, and 110c such that the participants in a conference call can hear each other participant. In the example depicted in FIG. 2, a total of three active calls are bridged together by the conference bridge 102. The mixer and speech analyzer module 202 combines several of the most recent and loudest audio speech or other sounds into a composite audio signal and plays or transmits this composite audio signal out to the conference endpoints 110a, 110b, and 110c. Each conference endpoint 110a, 110b or 110c included in the mix renders or plays the mixture of audio speech from the composite audio signal with its own input omitted from the mix.

As an example, the mixer and speech analyzer module 202 may combine two of the most recent and loudest audio speech from, for example, conference endpoints 110a and 110b into a composite audio signal and may transmit this composite audio signal to all the conference endpoints 110a, 110b, and 110c participating in the conference call. The conference endpoint 110c renders the mixture of audio speech from the composite audio signal, which effectively results in the broadcast of audio speech from both conference endpoints 110a and 110b. The conference endpoints 110a and 110b also render the mixture of audio speech from the same composite audio signal, but omit their own input from the mix. That is, the conference endpoint 110a broadcasts audio speech only from conference endpoint 110b while conference endpoint 110b broadcasts audio speech only from conference endpoint 110a.

Each conference endpoint 110a, 110b or 110c may be associated with an echo canceller module 204a, 204b or 204c, respectively. The echo canceller modules 204a, 204b, and 204c are configured to remove or reduce the echoes during a conference call in order to improve voice quality. In an example embodiment, each echo canceller module 204a, 204b or 204c may be configured to select or choose a particular echo mitigation process from a variety of different echo mitigation processes that is particularly suited to mitigate a specific type of echo. As explained in more detail below, the selection may be based on one or more parameters of the echo, that are identified by transmitting a test audio signal to one or more conference endpoints 204a, 204b, and/or 204c.

It should be appreciated that in other embodiments, the conference bridge 102 may include fewer, more or different modules apart from those shown in FIG. 2. In an example embodiment, the conference bridge 102 may additionally include a specialized controller that is configured to select an echo mitigation process that is particularly suited for a specific type of echo, which is explained in more detail below. In another example embodiment, the conference bridge 102 may include additional echo canceller modules to accommodate additional conference endpoints included in the conference system 200. In yet another example embodiment, the conference bridge 102 may additionally include a dedicated test audio signal generation module that is configured to generate a test audio signal, which is explained in more detail below.

Figure 3:
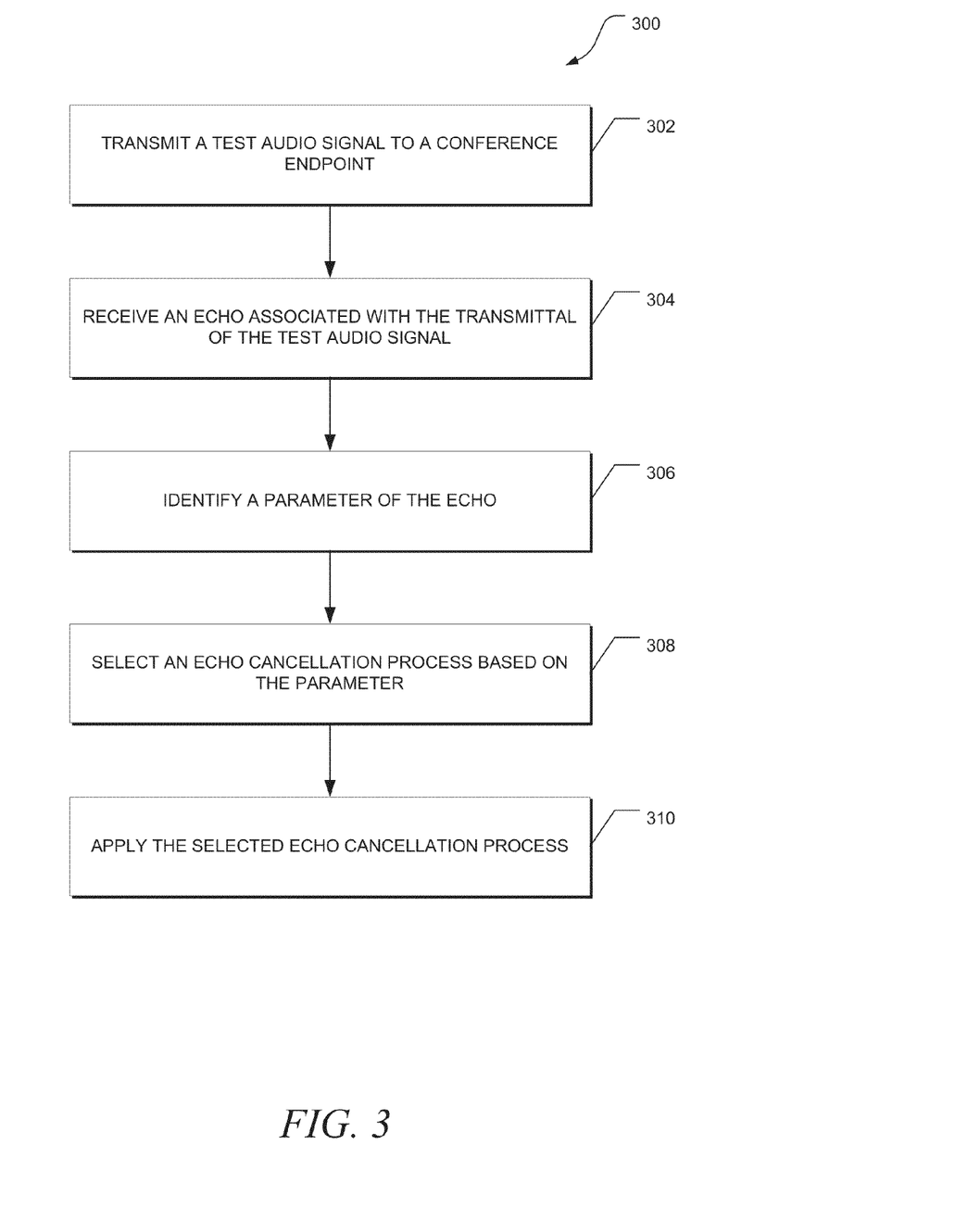
FIG. 3 depicts a flow diagram of a general overview of a method, in accordance with an example embodiment, for selecting an echo mitigation process based on one or more parameters of the echo.

FIG. 3 depicts a flow diagram of a general overview of a method 300, in accordance with an example embodiment, for selecting an echo mitigation process based on one or more parameters of the echo. In an example embodiment, the method 300 may be implemented by the mixer and speech analyzer module 202 and/or the echo canceller modules 204a, 204b, and 204c and employed in the conference bridge 102 of FIG. 2. As depicted in FIG. 3, the conference bridge transmits a test audio signal to a conference endpoint at 302. A "test audio signal," as used herein, refers to a representation of sound waves, the representation of which may be analog or digital, transmitted for the purpose of identifying parameters of the resulting echo. It should be appreciated that either the mixer and speech analyzer module or an echo canceller module may be configured to transmit the test audio signal. In an example embodiment, the test audio signal may be embodied as a monotone sound, which is a sound with a single tone. The test audio signal, as embodied as a monotone sound may, for example, be one or more short bursts of a wideband tone (e.g., three one-half second bursts separated by one second of silence between the wideband tones). In another example embodiment, the test audio signal may be embodied as a voice message. For example, the voice message may be an introductory voice message transmitted at the beginning of a conference call that identifies the conference endpoint to be connected to the conference call.

After the transmission, the conference bridge receives an echo associated with the transmittal of the test audio signal at 304 and either the mixer and speech analyzer module or an echo canceller module may be configured to identify one or more parameters associated with the echo at 306. As used herein, a "parameter" refers to a characteristic or aspect of the echo. A variety of different parameters may be identified. For example, in an example embodiment, the identification may include the measurement of an energy level associated with the echo. The "energy level," as used herein, refers to the strength of the echo. In another example embodiment, the identification may include the measurement of a round-trip time associated with the echo. The "round-trip time," as used herein, is a time delay between incident and reflected waves. In yet another example embodiment, the identification may include estimating the parameter's linear or non-linear transfer function associated with the echo.

Still referring to FIG. 3, either the mixer and speech analyzer module or the echo canceller module selects an echo mitigation process based on the identified parameters at 308. For example, as explained in more detail below, a particular echo mitigation process may be selected based on the round-trip time exceeding a certain pre-defined threshold, assuming that the energy level of the echo exceeds a certain threshold value, which is explained in more detail below. The echo canceller module then applies the selected echo mitigation process at 310 to mitigate the echo.

Figure 4:
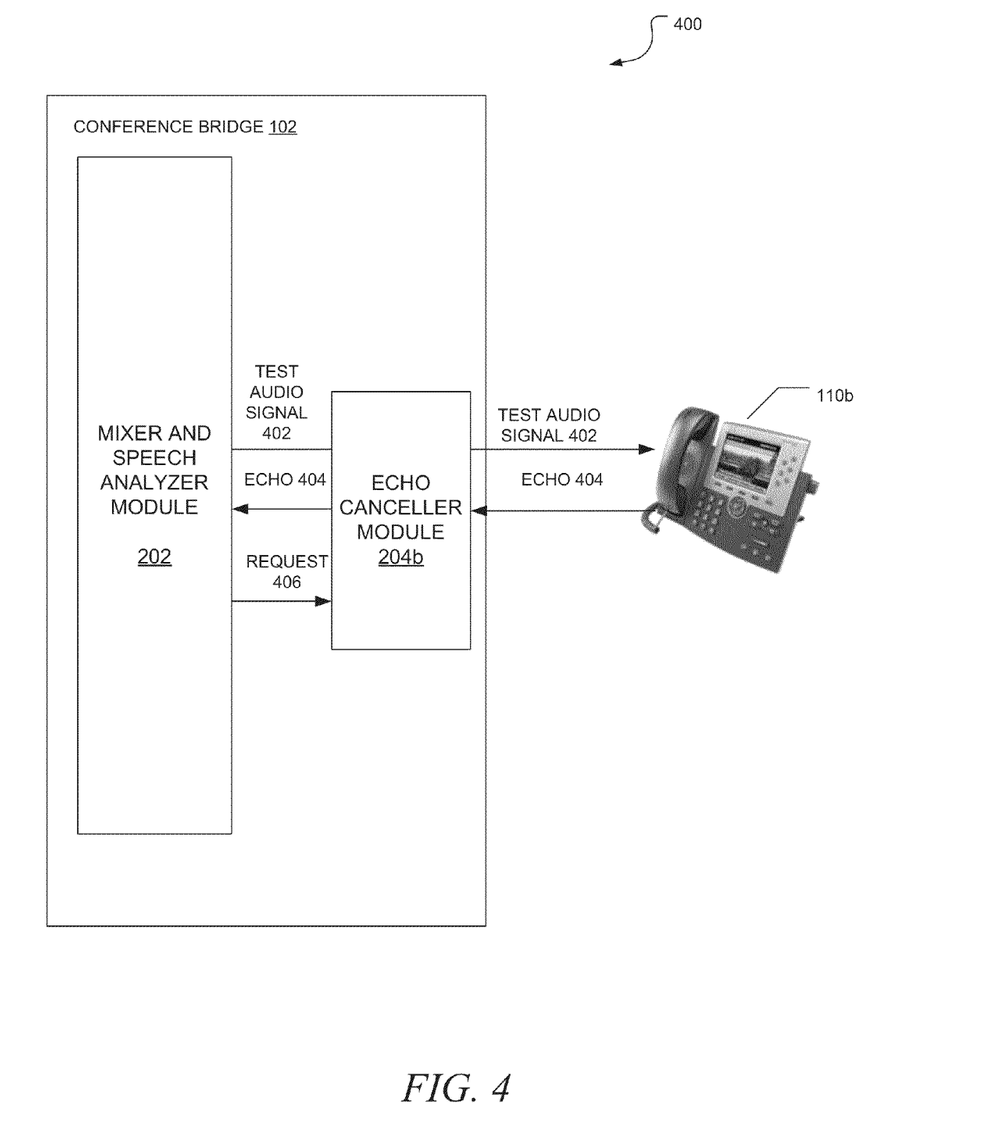
FIG. 4 depicts a diagram illustrating the various messages, in accordance with an example embodiment, transmitted between a conference bridge and a conference endpoint.

FIG. 4 depicts a diagram illustrating the various messages, in accordance with an example embodiment, transmitted between a conference bridge 102 and a single conference endpoint 110b. Here, a conference system 400 includes a conference bridge 102 in communication with a conference endpoint 110b, The conference bridge 102 includes the mixer and speech analyzer module 202 and the echo canceller module 204b. Here, the conference bridge 102 is configured to select a particular echo mitigation process based on identified parameters of the echo. To identify the parameters, in an example embodiment, the mixer and speech analyzer module 202 generates and transmits control messages and a test audio signal 402 to a conference endpoint 110b.

It should be noted that the mixer and speech analyzer module 202 may transmit the test audio signal 402 at a variety of different times throughout the conference call. In an example embodiment, the test audio signal 402 may be transmitted upon connection of the conference endpoint 110b to the conference bridge 102. As used herein, "upon connection" refers to a connection immediately or very soon after the conference endpoint 110b has connected to the conference bridge 102. As an example, the test audio signal 402 is transmitted at a start of the conference call or as soon as the conference endpoint 110b connects to the conference bridge 102. Here, as discussed above, the test audio signal 402 may be embodied as an introductory voice message notifying that the conference endpoint 110b has joined the conference call. At a start of the conference call, the participants at the conference endpoint 110b do not usually begin to talk until they are notified that they are connected to the conference call. As a result, transmitting the test audio signal 402 at the start of the conference call minimizes the amount of interference or other echoes from sources other than the test audio signal 402. In another example embodiment, the mixer and speech analyzer module 202 may transmit the test audio signal 402 at any time after the start of the conference call or at any time during the conference call.

As a result of the transmittal of the test audio signal 402, the mixer and speech analyzer module 202 receives an echo 404 and identifies one or more parameters associated with the received echo 404. Based on the identified parameters, the mixer and speech analyzer module 202 selects a particular echo mitigation process best suited to mitigate the specific type of echo 404, which is explained in more detail below. The mixer and speech analyzer module 202 then transmits a request 406 that identifies the selected echo mitigation process to the echo canceller module 204b. The echo canceller module 204b then applies the selected echo mitigation process identified from the request 406 to audio signals received from the conference endpoint 110b.

It should be appreciated that either the mixer and speech analyzer module 202 or the echo canceller module 204b may be configured to mitigate echoes based on identified parameters. For example, in another example embodiment, the echo canceller module 204b may also be configured to transmit the test audio signal 402, identify the parameters associated with the echo 404, select an echo mitigation process based on the identified parameters, and apply the selected echo mitigation process to audio signals received from the conference endpoint 110b.

Figure 5:
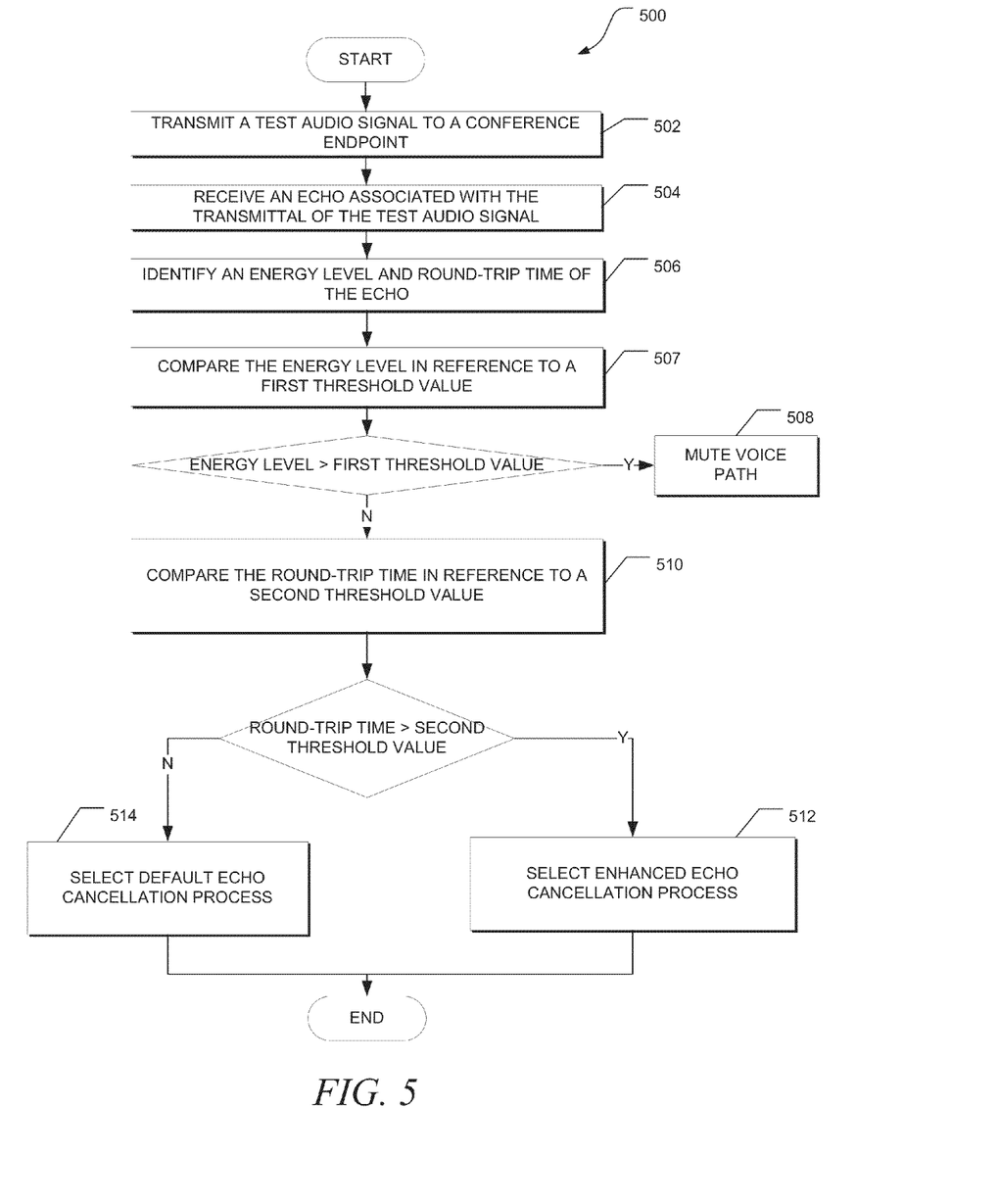
FIG. 5 depicts a flow diagram of a detailed method, in accordance with an example embodiment, for selecting an echo mitigation process based on a parameter of the echo.

FIG. 5 depicts a flow diagram of a detailed method 500, in accordance with an example embodiment, for selecting an echo mitigation process based on a parameter of the echo. At 502, a test audio signal is transmitted to a conference endpoint and as a result of the transmission, an echo is received at 504. It should noted that before the transmission of the test audio signal, echo mitigation may be initially disabled if the mixer and speech analyzer module is configured to identify parameters of the echo, but is later enabled when the echo mitigation process is applied. In an example embodiment, parameters associated with the echo, such as the energy level and the round-trip time, are identified at 506.

In an example embodiment, the identified energy level of the echo is compared with a first threshold value at 507, which is a predefined value defining an upper limit of an energy level of the echo. If the identified energy level exceeds this first threshold value, then further audio signals (or voice path) from the newly joined conference endpoint is muted at 508 and a notification may be sent to this conference endpoint that, for example, may notify that this conference endpoint is muted because of the poor quality of the voice path or the conference endpoint. As explained in more detail below, an audio signal may be muted by attenuating the audio signal. The notification may then include a message advising a participant to hang up and call back if the participant would like to actively participate in the conference call. Alternatively, the conference bridge may send another notification to the conference endpoint alerting the participant about the echo issue experienced by the system, disconnect the connection to the conference endpoint (e.g., hang up on the call), and utilize the caller identification of the participant to call him or reconnect to the conference endpoint on a different line.

If the identified energy level does not exceed the first threshold value, then the identified round-trip time is compared with a second threshold value at 510. This second threshold value may include a variety of predefined values. An example of a second threshold value may be based on an echo mitigation coverage associated with an echo canceller. The "echo mitigation coverage," as used herein, is a time delay or offset of the audio signal that an echo canceller is able to mitigate. That is, the echo mitigation coverage is the length of time the echo canceller stores its approximation of the echo in the echo mitigation buffer (memory). The "echo mitigation coverage" may also be referred to as an "effective tail length" and, as used herein, the terms may be used interchangeably. As an example, the second threshold value may equal the echo mitigation coverage (e.g., in milliseconds) or alternatively, based on multiples of the echo mitigation coverage (e.g., 1.5× echo mitigation coverage and 2× echo mitigation coverage). For example, if the echo canceller has an echo mitigation coverage of 128 milliseconds, then the second threshold value may also be defined as 128 milliseconds.

Upon comparison with the second threshold value, if the round-trip time is greater than the second threshold value, then the echo originating from that particular conference endpoint may be beyond the echo mitigation coverage of a typical echo mitigation process used by the echo canceller. As a result, an enhanced echo mitigation process, which is described in more detail below, may be selected at 512. On the other hand, if the round-trip time is less than the second threshold value, then a default echo mitigation process is selected at 514. As a result, the particular echo mitigation process selected for application is based on the parameters associated with the echo, which thereby results in the selection of an echo mitigation process that is particularly suited to each echo's unique parameters, which thereby results in more effective or "enhanced" echo mitigation.

Figure 6:
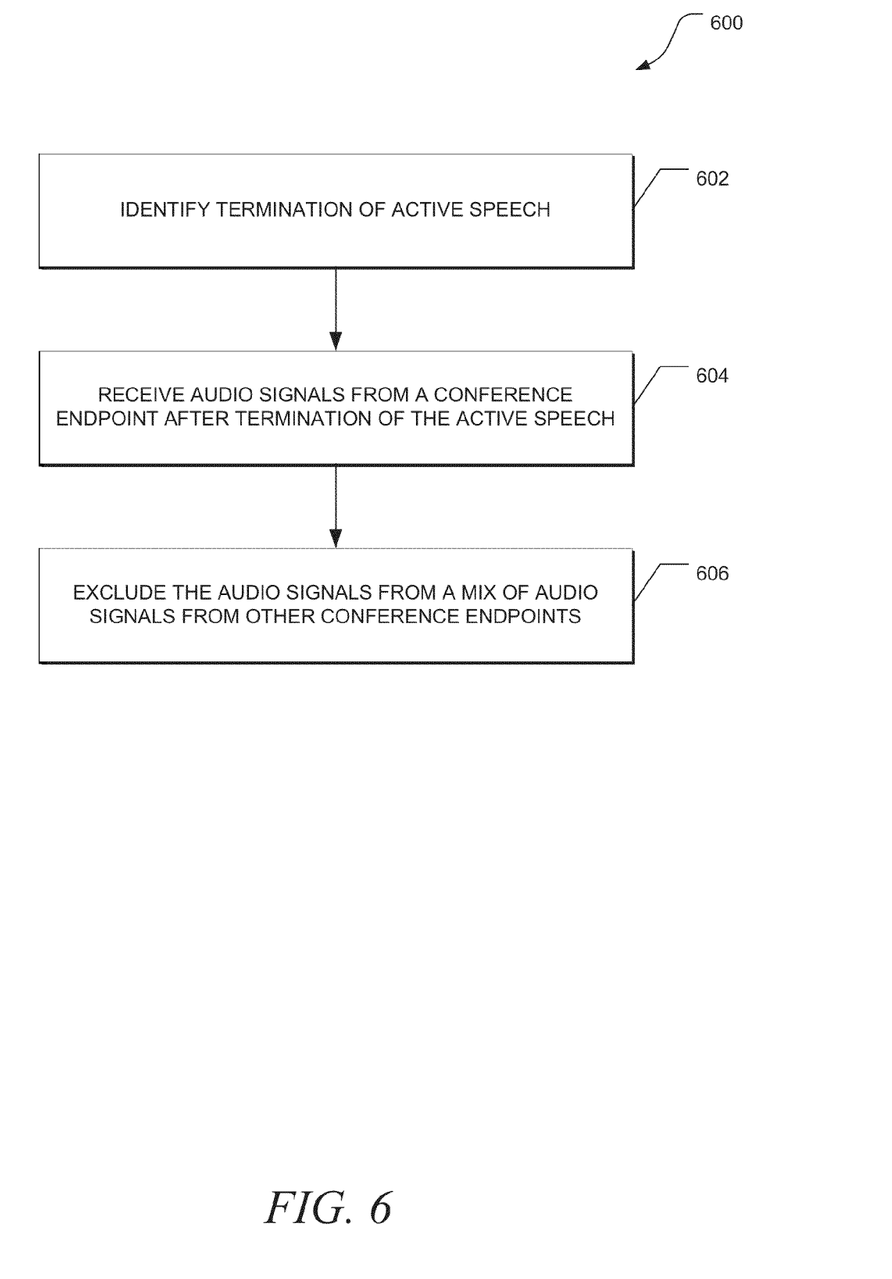
FIG. 6 depicts a flow diagram of operations of an example echo mitigation process that may be applied.

FIG. 6 depicts a flow diagram of the operations of an example echo mitigation process that may be applied. In an example embodiment, the method 600 may be implemented by the echo canceller module 204a, 204b or 204c and employed in the conference bridge 102 of FIG. 2. As shown in FIG. 6, an echo canceller may identify the termination of active speech at 602. In an example embodiment, active speech may be identified by measuring the energy level associated with an audio signal. The energy level may identify whether the incoming audio signal is associated with active speech or an echo. For example, if the energy level associated with an incoming audio signal exceeds a certain predefined threshold, then the echo canceller may identify the incoming audio signal as being associated with active speech. However, if the energy level associated with the incoming audio signal falls below this predefined threshold, then the echo canceller may identify that the incoming audio signal as being associated with an echo. In another example embodiment, the audio signal in the direction towards a conference endpoint may be compared with another audio signal returning from the same conference endpoint using signal processing techniques to identify whether the audio signal is associated with active speech or an echo.

Subsequent audio signals are then received from a conference endpoint at 604 after termination of the active speech is identified. Upon termination of the active speech, the audio signal may then be excluded from a mix of other audio signals from other conference endpoints at 606. As used herein, the term "exclude" refers to the non-transmittal of an audio signal or the elimination or removal of the audio signal from a signal mix. As a result, subsequent audio signals transmitted from that conference endpoint along a particular communication path are excluded rather than leaving the audio signal in the mix until the audio signal is eliminated by a subsequent speaker. Once active speech is detected, such active speech can be re-entered or included in the mix.

Figure 7:
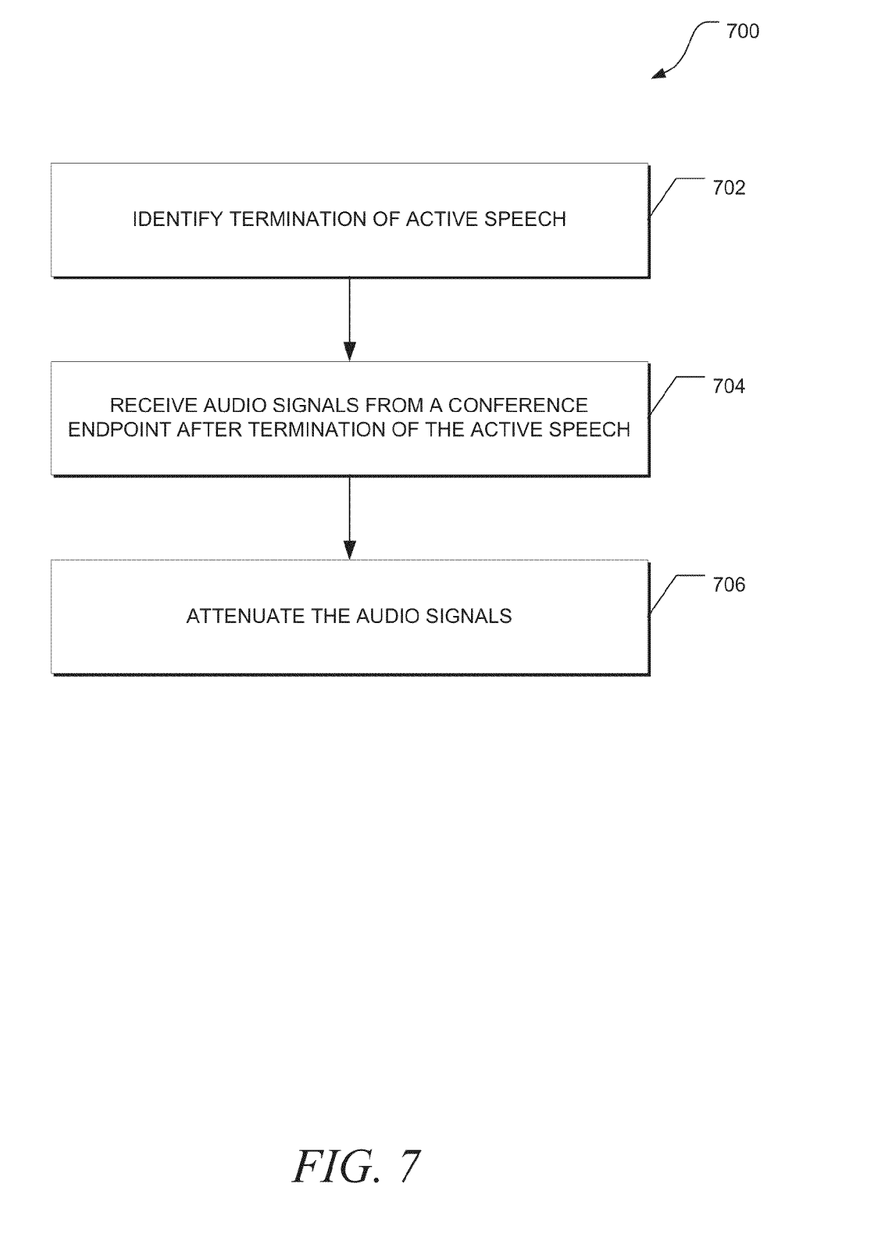
FIG. 7 depicts a flow diagram of operations of another example echo mitigation process that may be applied.

FIG. 7 depicts a flow diagram of the operations of another example echo mitigation process that may be applied. In an example embodiment, the method 700 may be implemented by the echo canceller modules 204a, 204b or 204c and employed in the conference bridge 102 of FIG. 2. As shown in FIG. 7, the termination of active speech from a conference endpoint is identified at 702. Thereafter, audio signals speech are received at 704 and then attenuated at 706. The attenuation of an audio signal is the reduction in amplitude and intensity of the audio signal. It should be appreciated that a variety of different attenuation techniques may be applied, such as techniques based on linear and non-linear processing of the echo audio signal.

Figure 8:
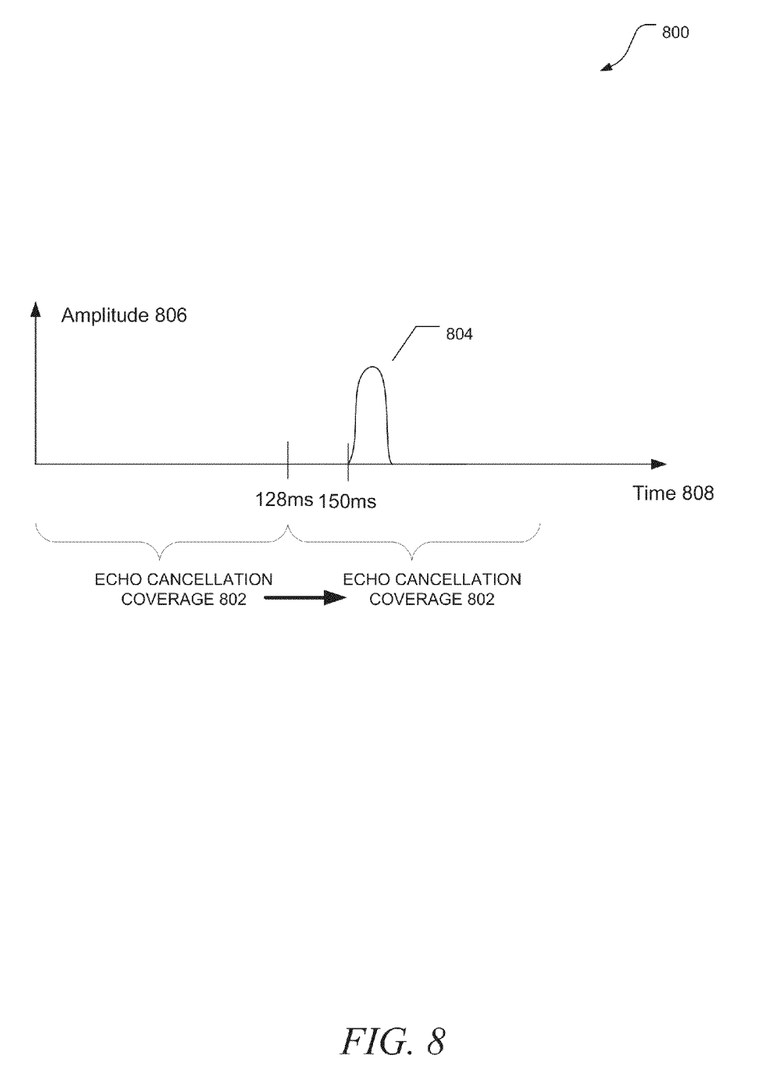
FIG. 8 depicts a plot of the energy level of an echo as a function of round-trip time, in accordance with an example embodiment, illustrating yet another example of an echo mitigation process that may be applied.

FIG. 8 depicts a plot 800 of the energy level of an echo 804 as a function of round-trip time, in accordance with an example embodiment, illustrating yet another example of an echo mitigation process that may be applied. The plot 800 includes a horizontal axis 808 that defines the round-trip time and further includes a vertical axis 806 that defines the energy level (in amplitude) of the echo 804.

The plot 800 shows that the example echo 804 has a round-trip time of 150 milliseconds, which is outside of the echo mitigation coverage 802 (or effective tail length). In the example of FIG. 8, the echo canceller has an echo mitigation coverage 802 up to, for example, 128 milliseconds. Depending on the round-trip time of the echo 804, the echo canceller may shift in time the echo mitigation coverage 802 to cover a time period where the echo 804 is actually located. For example, if the round-trip time associated with the echo 804 is 150 milliseconds, then the echo canceller may shift the echo mitigation coverage 802 from 0-128 milliseconds to 129-257 milliseconds, which covers the time period of the echo 804. As explained in more detail below, the echo canceller may shift the echo mitigation coverage 802 by inserting bulk delays into an echo estimation path from a conference endpoint.

Figure 9:
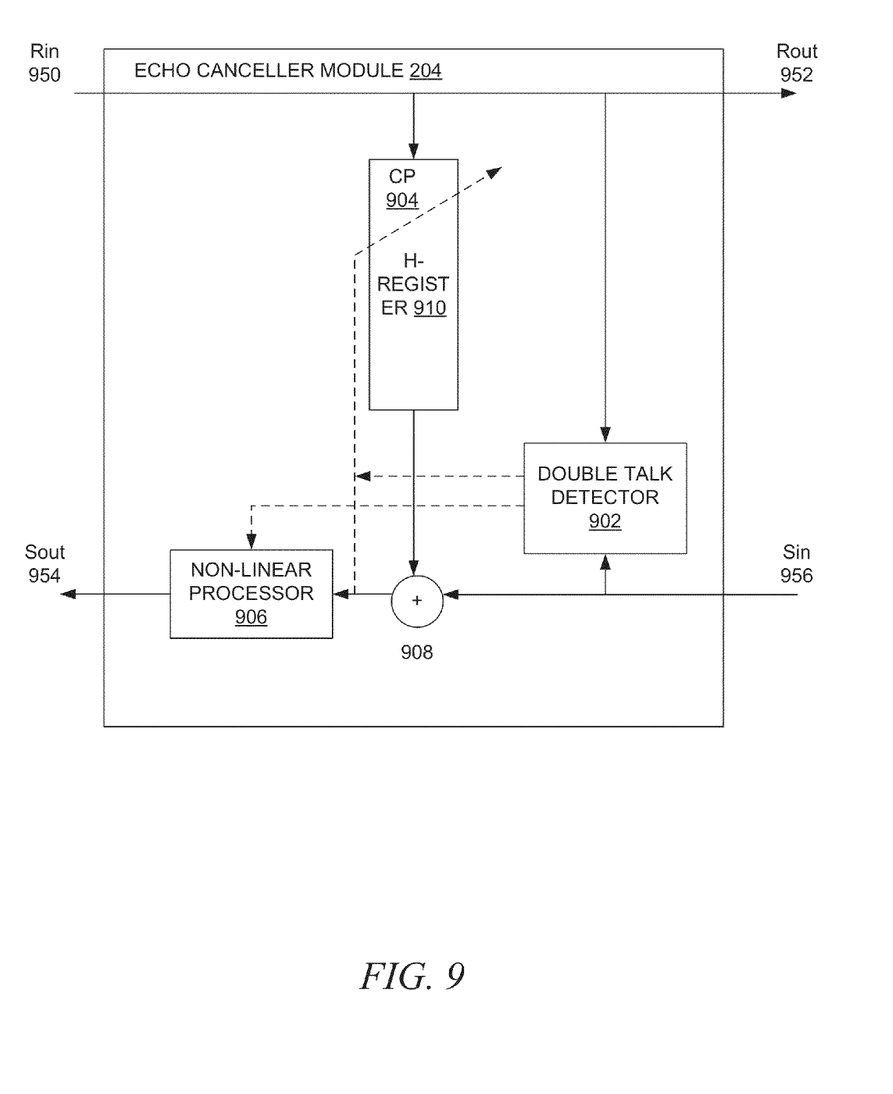
FIG. 9 depicts a block diagram of modules, in accordance with an example embodiment, included in an echo canceller module that is configured to apply the selected echo mitigation process.

FIG. 9 depicts a block diagram of modules 902, 904, 906, 908, and 910, in accordance with an example embodiment, included in an echo canceller module 204 that is configured to apply the selected echo mitigation process. The echo canceller module 204 may be embodied as any one of the echo cancellers 204a, 204b or 204c depicted in FIG. 2. As depicted in FIG. 9, the echo canceller module 204 may include a doubletalk detector 902, convolution processor 904, a non-linear processor 906, a summation block 908, and an H-Register 910. The two sides of the echo canceller module 204 in the received direction from a conference endpoint are referred to as Rin 950 and Rout 952. The echoes that are reflected back from the conference endpoint enter the echo canceller module 204 in the send direction at Sin 956 and any residual echo exists at Sout 954.

The convolution processor 904 is configured to create an estimate of an echo audio signal or impulse response as a function of time, which may be called an H-register image, based on the audio signals received at Rin 950 and Sin 956, and uses the estimate to mitigate the echo. The summation block 908 subtracts this estimate of the echo audio signal from the audio signals at Sin 956. It should be appreciated that the audio signal at the output of the summation block 908 may be referred to as an "error signal" because, for example, if the conference endpoint is not receiving speech and the echo audio signal is linear and time invariant and the estimate is perfect, then this audio signal can be zero assuming that the audio signal from Sin 956 is only resulting from an echo. However, if the estimate is not perfect, then the audio signal at the outputs of the summation block is representative of the error in approximating the residual echo audio signal and is used to update the convolution processor 904 towards a better convergence estimate.

The echo canceller module 204 also includes a doubletalk detector 902 that is configured to determine whether there is active speech in both the send and the receive directions. It should be appreciated that doubletalk is any period during a call when both the near-end signal and the far-end signal include speech. If the doubletalk detector 902 determines that the conference endpoint is silent, the H-Register 910 can seek to improve its estimate of the echo and the nonlinear processor 906 may be activated to attenuate any residual echo that might be returned back towards the conference bridge. If the doubletalk detector 902 determines that there is active speech in both directions, then H-Register 910 may stop adapting and the nonlinear processor 906 is deactivated.

It should be appreciated that the echo canceller module 204 may apply a variety of different echo mitigation processes, depending on the type of selection made. In the example of FIG. 9, a communication path is established between the logic of controlling the doubletalk detector 902 and the logic of controlling a state of a mixer and speech analyzer module included in the conference bridge. In an example embodiment, to apply the echo mitigation process described in FIG. 6, the doubletalk detector 902 informs the mixer and speech analyzer module to exclude the audio signals by removing this communication path from the signal mix if the doubletalk detector 902 identifies that active speech from the conference endpoint has terminated.

In another example embodiment, to apply the echo mitigation process described in FIG. 7, once the doubletalk detector 902 identifies that active speech has terminated, the output of the echo canceller module 204 is attenuated more aggressively than a default attenuation or even muted completely (e.g., 100% attenuation) to thereby prevent the echo from reaching the mixer and speech analyzer module. In both example embodiments described above, the identification that active speech has terminated can be made by the doubletalk detector 902 or additional delays can be built into the return path from the conference endpoint to allow the inclusion of speech detection logic.

In yet another example embodiment, to apply the echo mitigation process described in FIG. 8, the echo canceller module 204 may use the identified round-trip time to insert variable amounts of bulk delay in the echo canceller estimation path, which effectively shifts the echo mitigation coverage to adapt to the current round-trip time associated with the echo.

Figure 10:
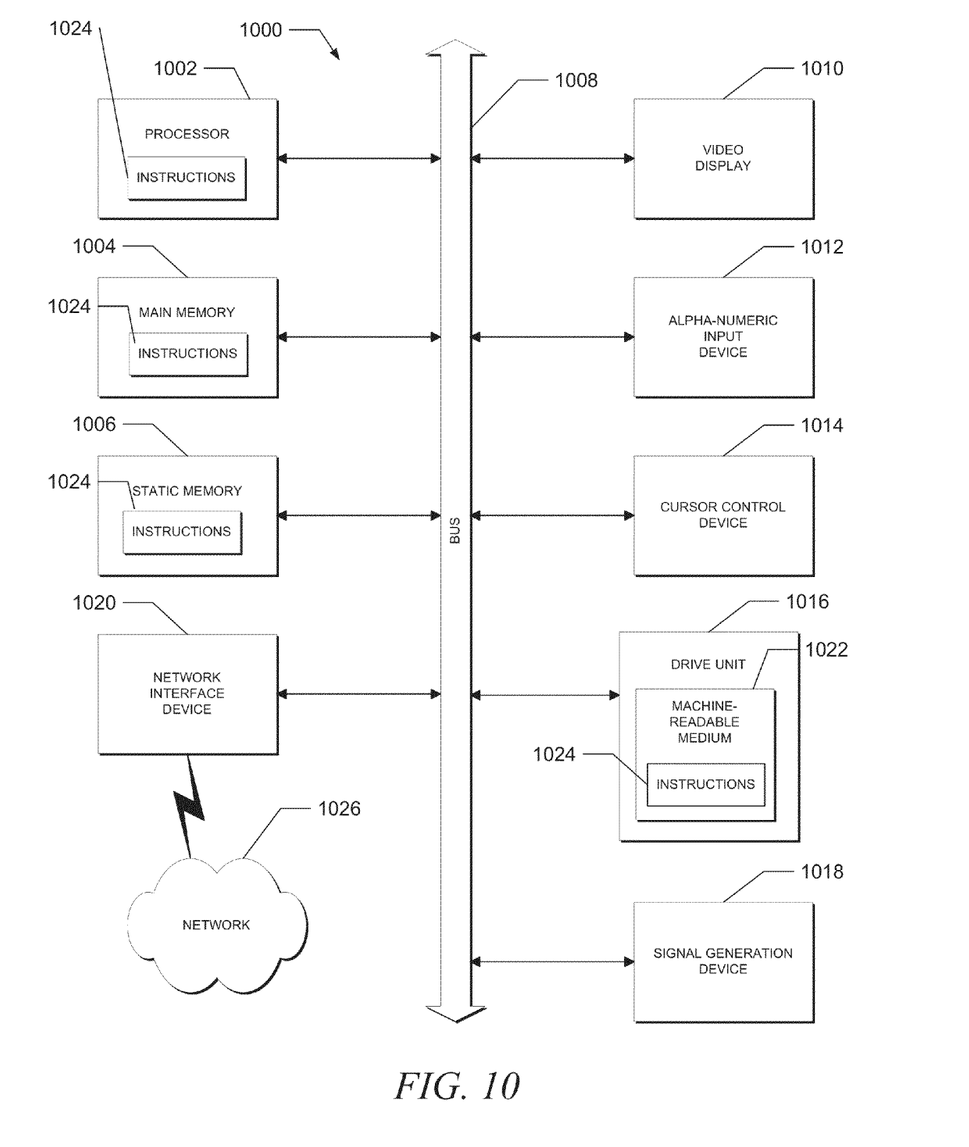
FIG. 10 is a simplified diagram of a machine in the example form of a processing system within which a set of instructions, for causing the machine to perform any one or more of the methodologies discussed herein, may be executed.

FIG. 10 is a simplified diagram of a machine in the example form of a processing system 1000 within which a set of instructions, for causing the machine to perform any one or more of the methodologies discussed herein, may be executed. In alternative embodiments, the machine may be connected (e.g., networked) to other machines. The machine may include any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example processing system 1000 includes processor 1002 (e.g., a central processing unit (CPU), a graphics processing unit (GPU) or both), main memory 1004 and static memory 1006, which communicate with each other via bus 1008. The processing system 1000 may further include video display unit 1010 (e.g., a plasma display, a liquid crystal display (LCD) or a cathode ray tube (CRT)). The processing system 1000 also includes alphanumeric input device 1012 (e.g., a keyboard), user interface (UI) navigation device 1014 (e.g., a mouse), disk drive unit 1016, signal generation device 1018 (e.g., a speaker) and network interface device 1020.

The disk drive unit 1016 includes machine-readable medium 1022 on which is stored one or more sets of instructions and data structures (e.g., software 1024) embodying or utilized by any one or more of the methodologies or functions described herein. The software 1024 may also reside, completely or at least partially, within main memory 1004 and/or within processor 1002 during execution thereof by processing system 1000, main memory 1004 and processor 1002 also constituting machine-readable, tangible media.

The software 1024 may further be transmitted or received over network 1026 via network interface device 1020 utilizing any one of a number of well-known transfer protocols (e.g., HTTP).

While machine-readable medium 1022 is shown in an example embodiment to be a single medium, the term "machine-readable medium" should be taken to include a single medium or multiple media (e.g., a centralized or distributed database, and/or associated caches) that store the one or more sets of instructions. The term "machine-readable medium" shall also be taken to include any medium that is capable of storing, encoding or carrying a set of instructions for execution by the machine and that cause the machine to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

While the invention(s) is(are) described with reference to various implementations and exploitations, it will be understood that these embodiments are illustrative and that the scope of the invention(s) is not limited to them. In general, techniques for echo cancellation may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

What is claimed is:

1. A method comprising:
    receiving from a conference endpoint, an echo associated with a transmittal of a test audio signal to the conference endpoint;
    identifying one or more parameters, each parameter associated with a distinct characteristic of the echo;
    selecting an echo mitigation process from among a plurality of echo mitigation processes based on comparison of the one or more parameters to one or more thresholds, wherein each echo mitigation process is particularly suited to mitigate a respective type of echo parameter; and
    applying the selected echo mitigation process.

2. The method of claim 1, wherein the parameter is an energy level associated with the echo.

3. The method of claim 2, wherein the selecting of the echo mitigation process comprises:
    comparing the energy level with a threshold value; and
    selecting an audio signal attenuation process as the echo mitigation process, responsive to the energy level being greater than the threshold value.

4. The method of claim 1, wherein the parameter is a round-trip time associated with the echo.

5. The method of claim 4, wherein the selecting of the echo mitigation process comprises:
    comparing the round-trip time with a threshold value; and
    selecting the echo mitigation process from the plurality of echo mitigation processes based on the comparison.

6. The method of claim 5, wherein the threshold value is based on an echo mitigation coverage associated with an echo canceller.

7. The method of claim 1, wherein the parameter is any one of a linear transfer function and a non-linear transfer function associated with the echo.

8. The method of claim 1, wherein the identifying of the parameter comprises measuring a round-trip time and an energy level associated with the echo.

9. An apparatus comprising:
an analyzer module configured to:
receive from a conference endpoint an echo associated with a transmittal of a test audio signal to the conference endpoint;
identify one or more parameters, each parameter associated with a distinct characteristic of the echo; and
select an echo mitigation process from among a plurality of echo mitigation processes based on comparison of the one or more parameters to one or more thresholds, wherein each echo mitigation process is particularly suited to mitigate a respective type of echo parameter; and
an echo canceller module configured to apply the selected echo mitigation process.

10. The apparatus of claim 9, wherein the parameter is an energy level associated with the echo.

11. The apparatus of claim 10, wherein the analyzer module is configured to select the echo mitigation process by:
comparing the energy level with a threshold value; and
selecting an audio signal attenuation process as the echo mitigation process, responsive to the energy level being greater than the threshold value.

12. The apparatus of claim 9, wherein the parameter is a round-trip time associated with the echo.

13. The apparatus of claim 12, wherein the analyzer module is configured to select the echo mitigation process by:
comparing the round-trip time with a threshold value; and
selecting the echo mitigation process from the plurality of echo mitigation processes based on the comparison.

14. The apparatus of claim 13, wherein the threshold value is based on an echo mitigation coverage associated with an echo canceller.

15. The apparatus of claim 9, wherein the parameter is any one of a linear transfer function and a non-linear transfer function associated with the echo.

16. The apparatus of claim 9, wherein the analyzer module is configured to identify the parameter by measuring a round-trip time and an energy level associated with the echo.

17. A non-transitory machine-readable storage medium having embodied thereon instructions executable by one or more machines to perform operations comprising:
receiving from a conference endpoint an echo associated with a transmittal of a test audio signal to the conference endpoint;
identifying one or more parameters, each parameter associated with a distinct characteristic of the echo;
selecting an echo mitigation process from among a plurality of echo mitigation processes based on comparison of the one or more parameters to one or more thresholds, wherein each echo mitigation process is particularly suited to mitigate a respective type of echo parameter; and
applying the selected echo mitigation process.

18. The storage medium of claim 17, wherein the parameter is an energy level associated with the echo.

19. The storage medium of claim 17, wherein the parameter is a round-trip time associated with the echo.

20. The storage medium of claim 19, wherein the selecting of the echo mitigation process comprises:
comparing the round-trip time with a threshold value; and
selecting the echo mitigation process from the plurality of echo mitigation processes based on the comparison.

21. The method of claim 1, further comprising:
receiving from a first conference endpoint a first echo associated with a transmittal of a first test audio signal to the first conference endpoint;
receiving from a second conference endpoint a second echo associated with a transmittal of a second test audio signal to the second conference endpoint;
identifying one or more parameters associated with characteristics of the first echo and one or more parameters associated with characteristics of the second echo;
selecting a first echo mitigation process from among a plurality of echo mitigation processes based on comparison of the one or more parameters associated with the characteristics of the first echo to one or more thresholds, wherein the first echo mitigation process is particularly suited to mitigate a respective type of first echo parameter;
selecting a second echo mitigation process, different from the first echo mitigation process, from among a plurality of echo mitigation processes based on comparison of the one or more parameters associated with the characteristics of the second echo to one or more thresholds, wherein the second echo mitigation process is particularly suited to mitigate a respective type of second echo parameter; and
applying the selected first echo mitigation process and the selected second echo mitigation process.

* * * * *